United States Patent [19]
Bretmersky et al.

[11] Patent Number: 5,995,909
[45] Date of Patent: Nov. 30, 1999

[54] METHOD OF COMPENSATING FOR CHANGES IN FLOW CHARACTERISTICS OF A DISPENSED FLUID

[75] Inventors: Carl A. Bretmersky, North Olmsted; Robert C. Hall, Strongsville; Richard G. Klein, Avon Lake, all of Ohio

[73] Assignee: Nordson Corporation, Westlake, Ohio

[21] Appl. No.: 09/199,227

[22] Filed: Nov. 24, 1998

Related U.S. Application Data

[63] Continuation of application No. 08/961,840, Oct. 31, 1997, which is a continuation of application No. 08/435,972, May 5, 1995, Pat. No. 5,687,092.

[51] Int. Cl.⁶ .................. G06F 1/38; B67D 5/08
[52] U.S. Cl. .................. 702/50; 702/45; 702/47; 364/528.17; 222/1; 222/55
[58] Field of Search .................. 702/45, 47, 50, 702/100; 364/528.01, 528.15, 528.17; 222/1, 55; 118/683; 239/68; 210/86, 143, 149

[56] References Cited

U.S. PATENT DOCUMENTS

| | | |
|---|---|---|
| Re. 35,010 | 8/1995 | Price .................. 222/1 |
| 1,647,273 | 11/1927 | Clayton-Kennedy . |
| 1,881,826 | 10/1932 | McQuade . |
| 3,862,414 | 1/1975 | Algeri . |
| 3,901,266 | 8/1975 | Guy . |
| 3,924,840 | 12/1975 | Nelson, Jr. . |
| 4,013,037 | 3/1977 | Warning, Sr. et al. . |
| 4,060,649 | 11/1977 | Coleman . |
| 4,075,976 | 2/1978 | Clayton . |
| 4,122,036 | 10/1978 | Lewis . |
| 4,166,246 | 8/1979 | Matt . |
| 4,183,726 | 1/1980 | Seebald . |
| 4,249,478 | 2/1981 | Gruener . |
| 4,301,944 | 11/1981 | Lestradet . |
| 4,315,317 | 2/1982 | Orchard et al. . |
| 4,357,900 | 11/1982 | Buschor . |
| 4,358,947 | 11/1982 | Greene et al. . |
| 4,361,333 | 11/1982 | Firth . |
| 4,367,075 | 1/1983 | Hartwig . |
| 4,374,704 | 2/1983 | Young . |
| 4,380,967 | 4/1983 | Matt .................. 118/669 |
| 4,385,611 | 5/1983 | Harper et al. . |
| 4,431,690 | 2/1984 | Matt et al. .................. 427/424 |

(List continued on next page.)

FOREIGN PATENT DOCUMENTS 2162770  12/1986  United Kingdom .

OTHER PUBLICATIONS

"Automotive Fuel Injection System, A technical Guide", by Jan P. Norbye, Motorbooks International, pp. 67–85, 103–106 no date.

*Primary Examiner*—Kamini Shah
*Attorney, Agent, or Firm*—Wood, Herron, Evans, L.L.P.

[57] ABSTRACT

A fluid dispensing control for controlling the dispensing of a fluid by a metering valve through a nozzle onto a workpiece. An initial value of a flow characteristic of the fluid is determined that is correlated to the relationship between the flow rate of the fluid and nozzle pressure. Desired nozzle pressure values are periodically determined by evaluating a model of flow rate of the fluid through nozzle in response to the initial value of the flow characteristic and a desired flow rate value. Thereafter, the control provides command signals to the metering valve as a function of the desired nozzle pressures. A new value of the flow characteristic is determined as a function of the measured volume of fluid dispensed during the dispensing cycle to the measured nozzle pressure. During a subsequent dispensing cycle, the control determines the desired nozzle pressures by evaluating the model of flow rate of the fluid through the nozzle as a function of the new value of the flow characteristic. The process of reevaluating the flow characteristic over successive dispensing cycles as a function of measured volumes of fluid dispensed and measured nozzle pressures, and using those updated values to reevaluate the model of flow rate of fluid through the nozzle, is repeated.

23 Claims, 5 Drawing Sheets

U.S. PATENT DOCUMENTS

| | | | |
|---|---|---|---|
| 4,433,237 | 2/1984 | Matt | 250/222.1 |
| 4,493,286 | 1/1985 | Carson | 118/677 |
| 4,500,937 | 2/1985 | Matt | 361/153 |
| 4,556,956 | 12/1985 | Dickenson et al. | 156/356 |
| 4,557,787 | 12/1985 | Mansfield et al. | 156/356 |
| 4,561,380 | 12/1985 | Mulder et al. | 118/688 |
| 4,613,059 | 9/1986 | Merkel | 222/52 |
| 4,618,931 | 10/1986 | Miller et al. | |
| 4,636,401 | 1/1987 | Yamazaki et al. | 222/52 |
| 4,645,133 | 2/1987 | Hagiwara et al. | 427/39 |
| 4,666,732 | 5/1987 | Schucker | 627/39 |
| 4,720,801 | 1/1988 | Boll | 364/528.18 |
| 4,797,301 | 1/1989 | Ardley et al. | 427/8 |
| 4,822,647 | 4/1989 | Nozaki et al. | 427/421 |
| 4,828,218 | 5/1989 | Medlock | 251/26 |
| 4,829,793 | 5/1989 | Holder et al. | 68/205 |
| 4,842,162 | 6/1989 | Merkel | 222/1 |
| 4,872,954 | 10/1989 | Hogan | 202/105 |
| 4,879,662 | 11/1989 | Vicari | 364/510 |
| 4,922,852 | 5/1990 | Price | 118/683 |
| 4,988,015 | 1/1991 | Price | 222/1 |
| 5,054,650 | 10/1991 | Price | 222/1 |
| 5,065,695 | 11/1991 | Baron et al. | 364/528.18 |
| 5,114,752 | 5/1992 | Hall | 427/273 |
| 5,182,704 | 1/1993 | Bengtsson | 346/148 |
| 5,263,608 | 11/1993 | Kiernan et al. | 222/1 |
| 5,293,553 | 3/1994 | Dudek et al. | 701/102 |
| 5,301,873 | 4/1994 | Burke et al. | 237/53 |
| 5,319,568 | 6/1994 | Bezaire | 364/479 |
| 5,327,473 | 7/1994 | Weigert | 377/21 |
| 5,687,092 | 11/1997 | Bretmersky et al. | 702/100 |
| 5,857,589 | 1/1999 | Cline | 222/1 |
| 5,878,374 | 3/1999 | Bachanan | 702/45 |

METHOD OF COMPENSATING FOR CHANGES IN FLOW CHARACTERISTICS OF A DISPENSED FLUID

This application is a continuation application of U.S. Ser. No. 08/961,840, entitled "Method of Compensating For Changes in Flow Cristics of a Dispensed Fluid", filed Oct. 31, 1997, allowed which in turn is a continuation application of U.S. Ser. No. 08/435,972, filed May 5, 1995, now U.S. Pat. No. 5,687,092.

FIELD OF THE INVENTION

The present invention relates generally to a system for dispensing fluids and, more particularly, the invention provides for a real time method of compensating for changes in the flow characteristics of the fluid being dispensed.

BACKGROUND OF THE INVENTION

The automated deposition of coating materials, such as adhesives, caulks, or sealants onto the surfaces of workpieces is commonly performed through the use of program control devices, such as robot-mounted fluid dispensing guns. The devices which support the guns are programmed to move the guns through a predetermined path with respect to a workpiece surface which corresponds to a desired pattern of application of the fluid onto the surface. In such devices, a control program establishes the tool speed, while a fluid dispensing control controls the discharge of fluid. The fluid is to be dispensed in accordance with an operator defined input signal which defines a desired physical characteristic of the applied fluid. For example, the input signal may represent bead size which defines the desired diameter of the bead to be applied to the workpiece. To achieve the desired bead size, the rate at which fluid is dispensed from the gun nozzle must be proportional to the relative velocity between the workpiece and the dispensing gun. Therefore, the rate at which fluid is dispensed through the gun nozzle must vary proportionally in real time in response to changes in the tool speed signal. The tool speed is defined as the linear or scalar speed at which the point of application of coating material on the workpiece surface moves with respect to the workpiece surface. The flow rate of fluid through the dispensing gun can be controlled by measuring the pressure drop across the nozzle of the dispensing gun and controlling the operation of a metering valve regulating the flow of fluid through the gun.

The above fluid dispensing process is further subject to unpredictable changes in the flow characteristics of the fluid being dispensed. For example, changes in temperature, and other conditions will change in real time the flow characteristics of the fluid being dispensed; and those changes in flow characteristics will change the flow rate and hence the volume of fluid dispensed. In addition, there are flow non-linearities introduced by the shear effects of the fluid flow through the dispensing nozzle; and those flow non-linearities are dependent on the nozzle and nozzle wear. Therefore, it is desirable that the volume of fluid dispensed over a dispensing cycle be a controlled variable, and the total volume of fluid dispensed each dispensing cycle is measured.

As disclosed in the Baron, et al. U.S. Pat. No. 5,065,695 issued to the assignee of the present invention, the fluid dispensing control compensates the tool signal by a correction factor that is determined as a function of the changes in viscosity caused by shear effects of the fluid through the nozzle. As part of a setup calibration procedure, the flow of fluid through the nozzle is measured in response to different tool speed signal settings thereby producing a table data values which are stored in the fluid dispensing control memory. The stored data is used to calculate an interpolated linearization factor which is applied to the adjusted tool speed signal. The stored linearization factor is correlated to the relationship between flow rate and nozzle pressure as measured during the calibration process. However, the stored data remains fixed, and hence, the compensation is fixed over many dispensing cycles even though the relationship of flow rate to nozzle pressure may change. While the change is compensated for in a volume measurement control loop, the above system has the disadvantage of not being more quickly responsive to changes in the flow rate-nozzle pressure relationship.

In addition, the volume of fluid measured during one dispensing cycle is compared to a volume set point, and a material volume error signal is produced that represents changes in material viscosity that are caused by temperature changes or other dynamic conditions. The material volume error signal provides a compensation for changes in material viscosity that are caused by temperature changes or other dynamic conditions. The material volume error signal is produced from a proportional and integrating comparator. The volume of material that is dispensed is compared to a material weight setting, that is, a volume set point to produce a material volume error signal. Within the proportional and integrating comparator, a proportional term is set equal to approximately one-half the error signal; and the integral term is equal to the difference between the proportional term and the prior integral term. Consequently, the material volume error signal changes the pressure command signal gradually over several dispensing cycles to bring the volume of material that is being dispensed into conformity with the volume set point. For example, five or more dispensing cycles may be required to effect the volume compensation. While the above described system performs the necessary compensation, a disadvantage of the system is that several dispensing cycles are executed before the compensation is complete.

With the above system, the volume set point is determined by a preproduction experimental process in which a sample part is fixtured in the proximity of the fluid dispensing nozzle to simulate a production situation. The dispensing cycle is then executed, and the fluid dispensing nozzle and the workpiece are moved relative to each other such that the fluid is applied to the sample part in the desired pattern. Several dispensing cycles and parts may be required until the dispensed bead visually appears to be correct. When the correct bead is identified, the volume flow meter for that particular dispensing cycle is read; and the value of the volume flow meter is utilized as the material volume set point. Thereafter, the volume set point is conveyed to the production environment as part of the fluid dispensing program associated with that part.

There are several disadvantages with the above experimental process for determining the material volume set point. First, the experimental process requires that fluid be dispensed on workpieces that most probably are not usable in subsequent production. In addition, the volume set point is a part dependent parameter that must be carried with the other part related information adds to the complexity and cost of the overall system. Second, the experimentally determined material volume set point is a function of the flow characteristics of the fluid being dispensed during the test cycle. The flow characteristics of the fluid being dispensed during a subsequent production cycle may be different; and therefore, the volume represented by the previously determined volume set point may require further compensation in the production environment.

SUMMARY OF THE INVENTION

To overcome the disadvantages described above, the present invention provides a fluid dispensing control requiring minimal calibration procedures which are automatically performed to provide an initial value of a flow characteristic that is correlated to the relationship between the fluid flow rate through the nozzle and nozzle pressure. The fluid dispensing control of the present invention periodically and automatically determines a new value of the fluid flow characteristic in response to measured values of nozzle pressure and dispensed fluid volume. The present invention further provides a fluid dispensing control that is independent of the part or workpiece to which the fluid is being applied. For example, desired nozzle pressures within a fluid dispensing cycle are determined independent of a volume set point. In addition, the volume set point is determined automatically during a dispensing cycle. The present invention provides a highly responsive real time control of pressure and volume of the dispensed fluid that is effective to provide a high quality application of the fluid.

According to the principles of the present invention and in accordance with the described embodiments, a fluid dispensing control provides a method of compensating for variations in fluid flow characteristics over multiple dispensing cycles. The process determines initial values of a flow characteristic of the fluid correlated to the relationship between flow rate of the fluid through the nozzle and nozzle pressure. Thereafter, the control periodically determines during a first dispensing cycle desired nozzle pressures by evaluating a model of flow rate of the fluid through the nozzle as a function of the initial values of the flow characteristic and a desired flow rate value. The control periodically provides command signals to the metering valve as a function of the desired nozzle pressure values. In addition, the dispensing control measures during that first dispensing cycle the nozzle pressure and the volume of fluid dispensed; and thereafter, the control determines a new value of the flow characteristic of the fluid that correlates the measured volume of fluid dispensed during the first dispensing cycle to the measured nozzle pressure. During a subsequent dispensing cycle, the control determines desired nozzle pressure values by evaluating the model of flow rate of the fluid through the nozzle as a function of the new value of the flow characteristic and a desired flow rate value. During successive dispensing cycles, the control then iterates the process of determining new values of the flow characteristic as a function of the measured volume of fluid dispensed and measured nozzle pressure and reevaluating the model utilizing the updated value of the flow characteristic. The above process has the advantage of continuously in real time updating a flow characteristic function that is correlated to the relationship between the measured flow rate of fluid and the measured nozzle pressure. Therefore, the invention responds very quickly in real time to changes in the flow rate-nozzle pressure relationship which typically are caused by changes in temperature or other factors that change the viscosity of the fluid being dispensed. The invention therefore very quickly responds in real time to changes in the fluid flow characteristics with the advantages of providing more consistency in the dispensing and application of the fluid, thereby providing a higher quality fluid dispensing process.

In another embodiment of the invention, the dispensing control periodically determines desired nozzle pressure values by evaluating a model of flow rate of the fluid through the nozzle that is independent of a fluid volume set point. The above fluid dispensing control process has a first advantage of operating independently the volume set point which reduces the complexity of the control. Further, in another aspect of the invention, the volume set point is automatically determined during the dispensing cycle by integrating the desired value of the flow rate of the fluid over the dispensing cycle. Therefore, the prior volume set point calibration cycle is eliminated with the advantage of simplifying the control and the process and eliminating the handling of the volume set point in association with the workpiece program. Therefore, the above process has the advantage of being substantially more efficient and easier to use.

In a further embodiment of the invention, the fluid dispensing control measures the temperature of the fluid being dispensed from the nozzle and periodically evaluates a model of flow rate of the fluid through the nozzle that is a function of fluid temperature change, a desired flow rate value and an initial value of the fluid flow characteristic through the nozzle. This embodiment of the invention is particularly useful in those applications where the temperature of the fluid being dispensed changes within a dispensing cycle. Such conditions may be encountered in a particularly harsh manufacturing environments or in applying fluid to particularly large parts. This embodiment provides an additional element of real time control which compensates for environmental conditions that produces irregular and unpredictable changes in the fluid flow characteristics. Therefore, the above fluid dispensing control has the advantage of being more sensitive and more responsive to changes in the fluid flow characteristics and thereby providing a higher quality and more accurate dispensing and application of the fluid onto the workpiece.

The fluid dispensing control of the present invention provides a fluid dispensing control that minimizes the amount of preproduction calibration, that more quickly adjusts fluid flow in response to changes in the flow characteristics of the fluid, for example, viscosity, and that adjusts fluid flow in response to detected changes in temperature. These and other objects and advantages of the present invention will become more readily apparent during the following detailed description together with the drawings herein.

DETAILED DESCRIPTION OF THE INVENTION

Figure 1:
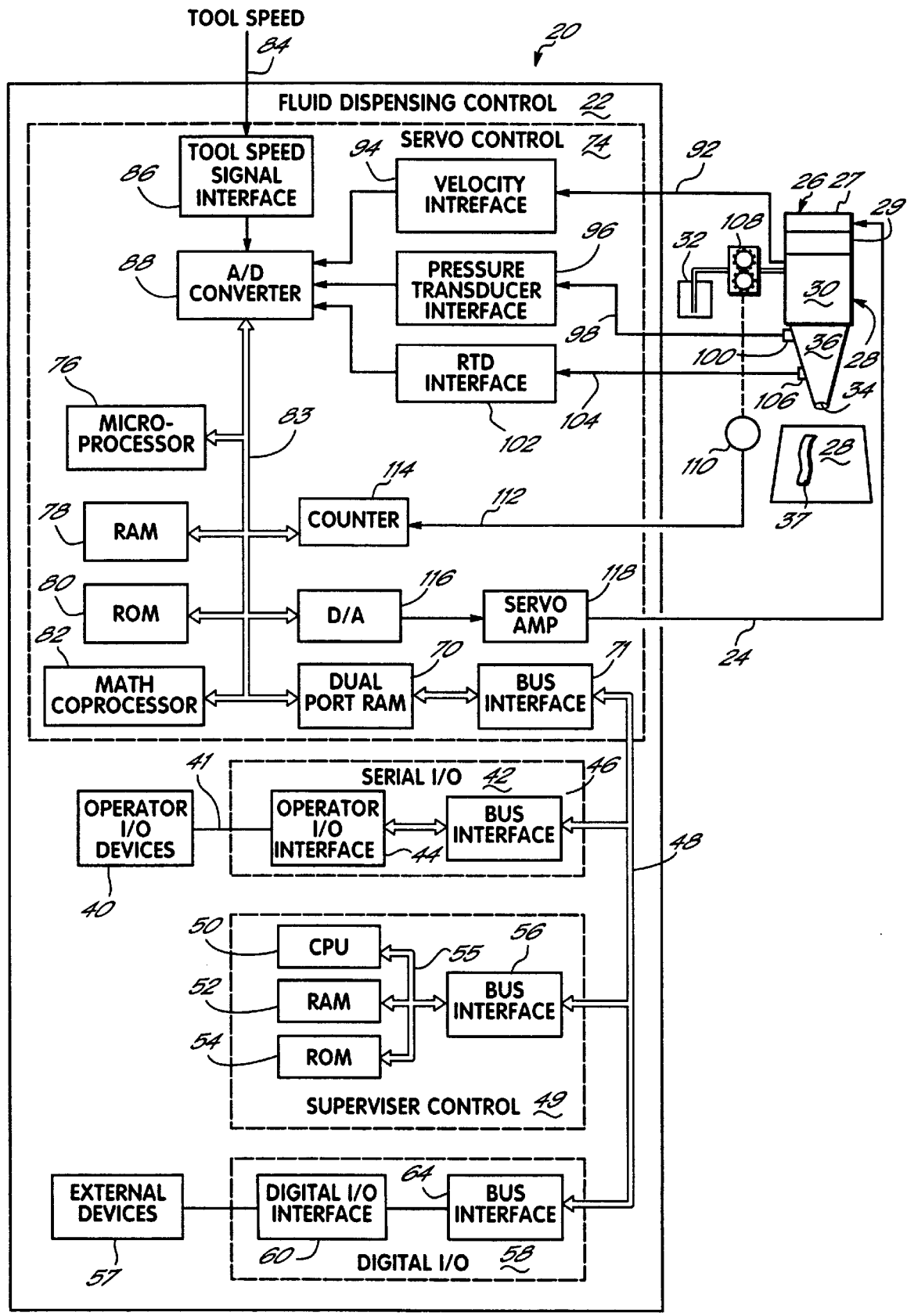
FIG. 1 is a schematic block diagram of a fluid dispensing system embodying the principles of the present invention.

FIG. 1 illustrates a fluid dispensing system 20 comprising a fluid dispensing control 22 which provides an output command signal on line 24 to an electromechanical servo actuator 26 operatively connected to a fluid dispensing gun 28. The servo actuator 26 may be any one of a number of different types of linear actuators having a rapid response. The servo actuator 26 preferably includes an electrically actuated pneumatic servo valve 27 that ports air to a double-acting pneumatic cylinder 29. The cylinder 29 has a cylinder rod (not shown) mechanically coupled to a stem (not shown) of a metering valve 30 within the fluid dispensing gun 28. The fluid dispensing control 22 provides output signals to the servo actuator 26 which controls the operation of the metering valve 30, thereby regulating the flow of fluid from a reservoir or source of fluid 32 through an orifice 34 of nozzle 36. Preferably the fluid dispensing gun 28 dispenses a bead 37 of fluid, for example, a caulk, sealant or adhesive onto a workpiece 38 moving with respect to the fluid dispensing gun 28. Typically, either the fluid dispensing gun 28 and/or the workpiece 38 are mounted on a robot arm, moving table, or other device which has a control independent of the fluid dispensing control 22.

The fluid dispensing control 22 includes operator I/O devices 40 which preferably include a keypad and video display terminal (not shown).

The operator I/O devices 40 further include a processor (not shown) for handling the communication of data between the video display terminal and the keypad and the serial I/O 42. The processor associated with the operator I/O devices 40 may be any one of a number of commercially available processors or PC's. Preferably, the processor within the operator I/O devices 40 is a "NEURON CHIP" 3150 processor commercially available from Motorola of Phoenix, Ariz. The processor in the operator I/O devices 40 is connected by a twisted pair cable 41 to the operator I/O interface 44 within the serial I/O interface 42. Preferably the operator I/O interface 44 is also a "NEURON CHIP" 3150 processor and functions to exchange data with the bus interface 46. The bus interface 46 handles the transfer of data to and from a bus 48 which is preferably a parallel 16 bit data bus. Although not shown, the serial I/O 42 may also include other serial communications links, for example, other "NEURON CHIP" processors, an RS-232 port, etc.

The bus 48 is connected to a supervisor control 49 which includes a central processing unit "CPU" 50, preferably, a 68000 microprocessor available from Motorola of Phoenix, Ariz., volatile and nonvolatile RAM storage 52, ROM storage 54, and bus 55 connected to a bus interface 56. The supervisor control 49 functions basically as an I/O processor and coordinates the communication of data to and from the operator I/O devices 40 and to and from external devices 57 generally located remote from the fluid dispensing control 22. Since the general modes and cycles of operation are initiated either by inputs from the operator I/O devices 40 or the external devices 57, the supervisor control 49 provides input signal states to the servo control 74 which executes various tasks in the fluid dispensing cycle. The operator I/O devices 40 is used to initiate different modes of operation, for example, a set up mode, and an operating mode. In the set up mode, the operator uses the I/O devices 40 to enter information relating to the desired flow, for example, bead size, and scaling factors such as the flow meter encoder pulse count per revolution.

In addition, the operator I/O devices 40 display information relating to the dispensing process, for example, alarm or error signals.

The supervisor control 49 stores various operating programs in ROM 54 that command desired sequences of tasks or events depending on the desired current control operation and detected external conditions. As will be described in more detail, the supervisor control 49 provides commands within the fluid dispensing control that start and end a dispensing cycle, that turn ON and turn OFF the dispensing gun, etc. The supervisor control 49 provides other schedules of events depending on the then current operation of the fluid dispensing control 22.

The fluid dispensing control 22 further includes digital I/O 58 which has a digital I/O interface 60 that provides and receives digital signals to and from, respectively, external devices 57 within the fluid dispensing system. Preferably, the digital I/O interface 60 provides 16 bits of I/O data.

Input data typically includes beginning of part and end of part signals, a part identification word, a dispensing gun ON/OFF signal, etc. Input signals are received from the external devices 57 that may or may not have their own respective digital I/O interface (not shown) on one of the digital I/O lines 62 connected to a respective input of the digital I/O interface 60. Those input signals are passed to the bus 48 by a bus interface 64, and the supervisor control 49 receives the input signals from the bus 48 through its bus interface 56. During its operation, the supervisor control 49 will detect different conditions and process states. Those process conditions include the values of measured process variables, for example, nozzle pressure, material temperature, and error conditions; and the supervisor control will either provide some of those process conditions to the display within the operator I/O devices 40, or provide output digital signals representing those process conditions from the fluid dispensing control 22, or provide both. In the case of providing a digital output signal, the CPU 50 within the supervisor control 49 will transfer the digital output signal to the bus interface 56, across the bus 48, to the bus interface 64 and to a respective output of the digital I/O interface 60. That digital output signal is then available on a respective one of the digital I/O lines 62 and is read or received by the external devices 47 within the system.

The fluid dispensing control 22 further includes a servo control 74 operating in conjunction with the supervisor control 49. Data is exchanged between the servo control 74 and the supervisor control 49 through a dual port RAM 70. The dual port RAM 70 is preferably a 16 bit shared memory device commercially available from Cypress of San Jose, Calif. Within the servo control 74, a microprocessor 76 executes programs or routines stored in ROM 80. In executing those programs, the microprocessor utilizes the RAM 78, floating point math coprocessor 82, and an interconnecting 16 bit parallel bus 83. The microprocessor 76 is preferably a model 68HC16 microprocessor, and the coprocessor 82 is also preferably one of the 68000 family of processors commercially available from Motorola of Phoenix, Ariz. Analog data is received from various components within the fluid dispensing system 20 and is converted to corresponding digital signals by an A/D converter 88 which preferably is a 10 bit A/D converter available on the microprocessor 76.

Figure 2:
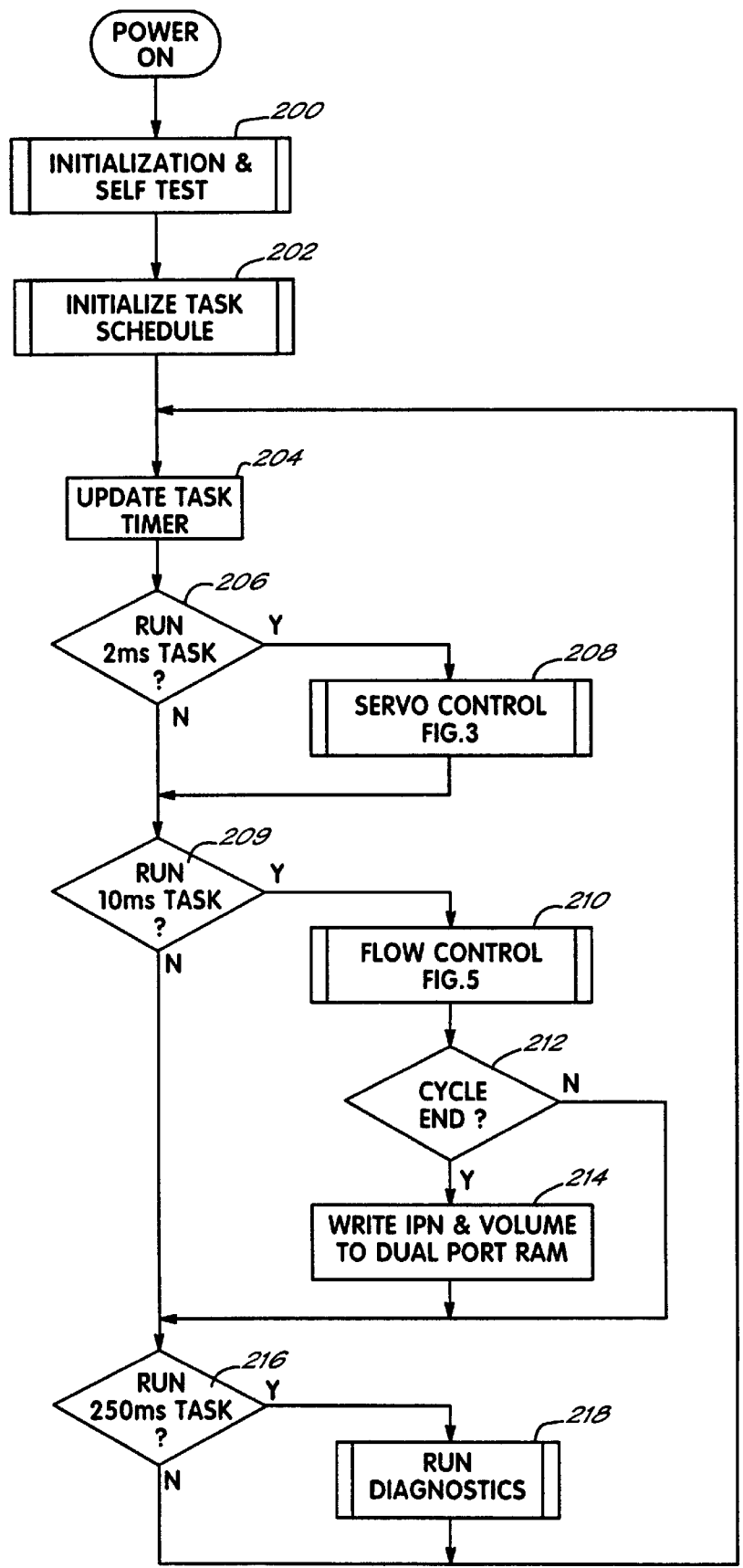
FIG. 2 is a flow chart illustrating the general cycle of operation of the servo control microprocessor within the fluid dispensing control.

Upon power being applied to the microprocessor 76 and other devices within the servo control 74, a power ON or reset program or routine stored in ROM 80 is executed. Referring to FIG. 2, the power on routine at 200 first executes initialization and self test subroutines. Those subroutines run standard tests of the hardware within the servo control 74. The remainder of the power ON routine is a real time task scheduler which preferably responds to a 2 millisecond (ms) clock. The power ON routine at 202 first initializes the task scheduler. Initialization includes resetting the counters and/or timers which are included within the scheduler and, if necessary, priorities of the scheduled tasks are rearranged.

Figure 5:
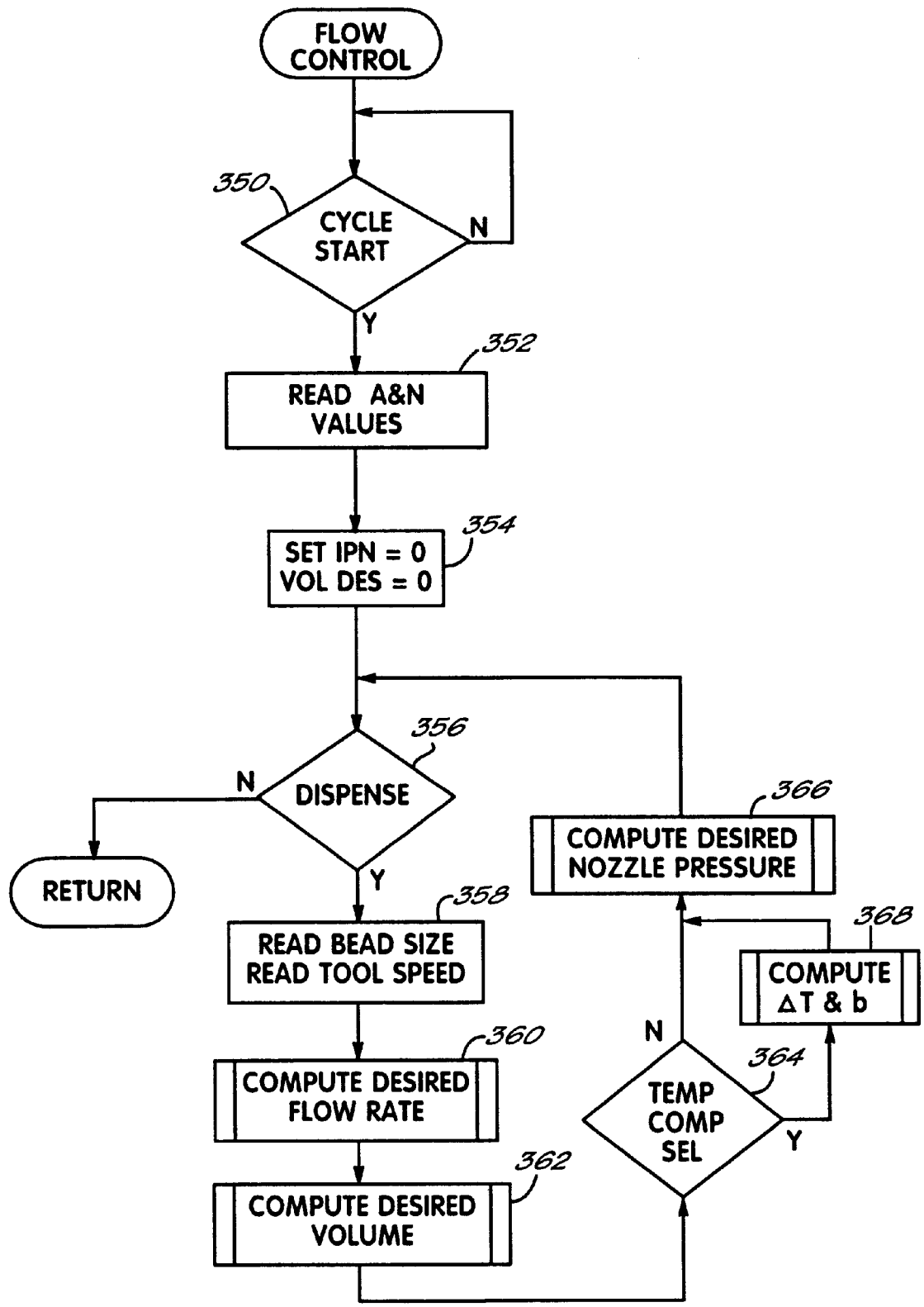
FIG. 5 is a flow chart illustrating a process for dispensing fluid in accordance with the principles of the present invention.

The power ON routine continues at 204 to update the task timer within the task scheduler. Thereafter, at 206 the routine determines whether to run 2 ms tasks, for example, the servo control subroutine at 208 within the power ON routine. The operation of the servo control subroutine shown in FIG. 3, controls the dispensing of fluid from the nozzle and will be subsequently described. The power ON subroutine at 209 then determines whether the tasks which are iterated every 10 ms should be run. If so, the routine executes, for example, the flow control subroutine at 210, which is illustrated in more detail in FIG. 5 and will be subsequently described. The routine then at 212 determines whether the flow control cycle end, that is, an end of part or end of dispensing cycle, has been detected; and, if so, the routine causes the most recently determined IPN and flow counter values to be written to the appropriate locations in the dual port RAM 70. The routine then determines at 216 whether it is time to run the diagnostics subroutine at 218 which is executed every 250 ms. Thereafter, the routine returns to update the task timer at 204; and the microprocessor 76 continuously iterates through process steps 204 through 218 for as long as power is applied to the servo control 74.

Figure 3:
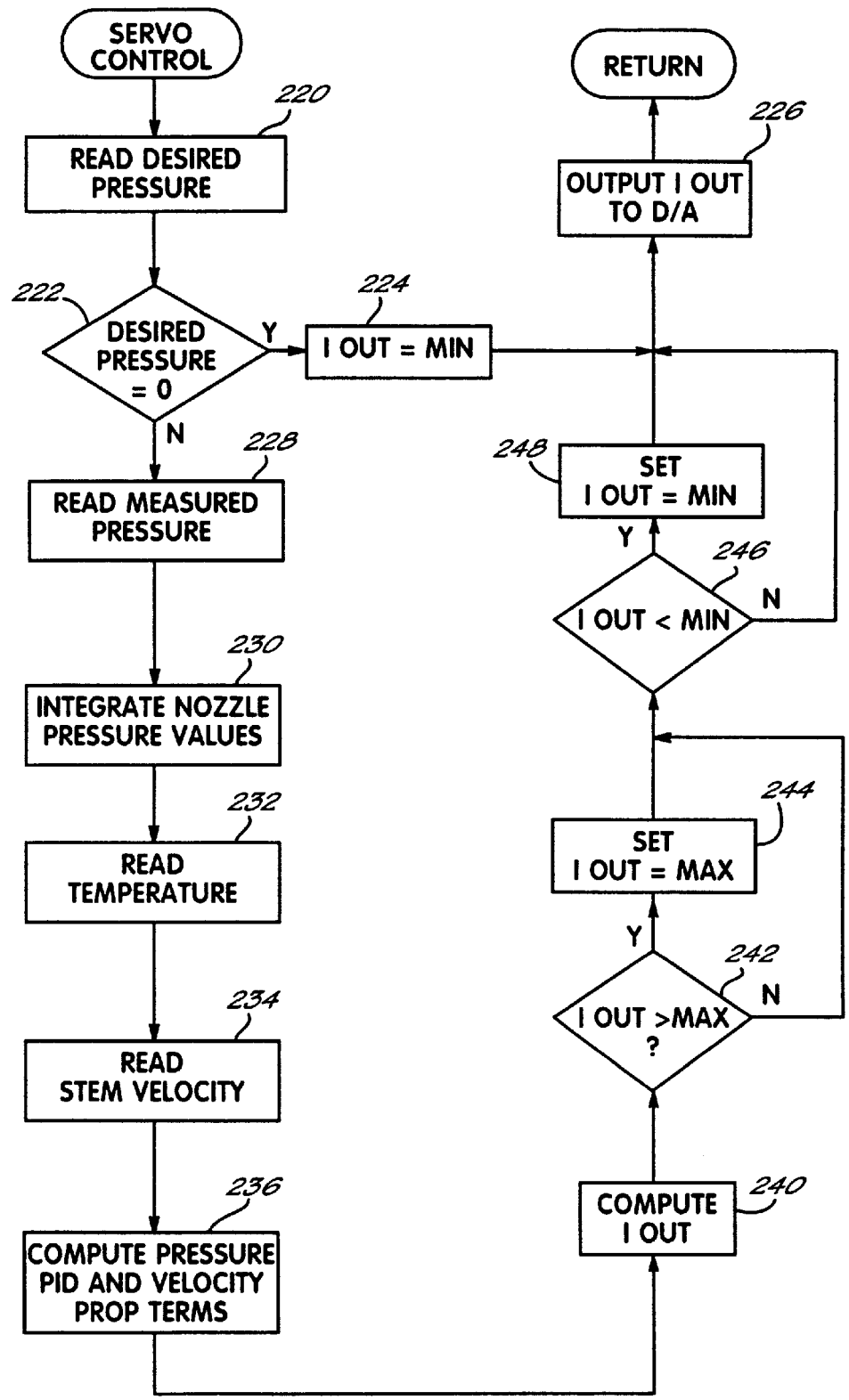
FIG. 3 is a flow chart of a subroutine of FIG. 2 illustrating the details of the servo control process of providing an output signal to the servo valve.

The servo control subroutine at 208 of FIG. 2 is illustrated in detail in FIG. 3. With each execution of the servo control subroutine 208, the subroutine first at 220 reads the desired pressure which is determined by the servo control 74 and stored in a location within the RAM 78. If the desired pressure is zero as detected at 222, the microprocessor then reads a minimum current value 224 stored in ROM 80 and outputs at 226 that minimum current value to D/A converter 116. The analog output from the D/A converter 116 is amplified in servo amp 118 and a minimum current command signal is provided on output line 24 to the servo valve 26. Thereafter, the microprocessor at 228 samples the analog pressure signal provided by the pressure transducer interface 96 of FIG. 1. The pressure transducer interface 96 preferably includes a high impedance input instrument amplifier with good noise rejection characteristics. A low pass filter is also used to stabilize the pressure signal on line 98 from pressure transducer 100. Pressure transducer 100 is mounted on the dispensing head 28 close to the dispensing nozzle 36 and measures the pressure drop of the fluid as it is discharged through the orifice 34. The microprocessor 76 reads and stores a digital pressure signal from the A/D converter 88 as provided by the pressure transducer interface 96. Thereafter, the microprocessor 76 at 230 integrates nozzle pressure values that will subsequently be described.

At 232 the microprocessor 76 samples an analog temperature value provided by the RTD interface 102. The RTD interface 102 is a resistance temperature device that receives a temperature signal on input line 104 from a temperature sensor or transducer 106. The temperature sensor 106 measures the temperature at a point in the fluid stream that is upstream and ahead of, but in proximity to, the dispensing gun 28. Preferably, the temperature transducer 106 is a standard nickel temperature sensor having a 120 OHM and is commercially available from Minco of Minneapolis, Minn. The microprocessor 76 reads and stores a digital temperature value from the A/D converter 88 as provided by the RTD interface 102.

At 234 the microprocessor reads and stores a digital stem velocity signal from A/D converter 88 as provided by the velocity interface 94. The velocity interface receives an analog stem velocity signal on its input line 92 from a velocity transducer (not shown) which is mounted on the dispensing gun 28. The transducer is mounted with respect to the metering valve such that the velocity transducer provides a velocity feedback signal as a function of motion of the stem of the metering valve.

The microprocessor then at 236, 240 of FIG. 3 uses the stem velocity feedback signal and the pressure signal to execute digital PID processes. Proportional, integral and derivative terms are calculated from the pressure signal; and a proportional velocity term is calculated from the velocity signal. Each of those terms has a gain or multiplier that is in the range of from zero to a value and that is empirically determined to provide the desired response and stability to the operation of the servo actuator 26 and the metering valve 30. For example, the gain of the proportional and derivative terms of the pressure signal is reduced to one-third its normal value when the dispensing gun is initially turned ON. Thereafter, the gain value for those proportional and derivative terms of the pressure signal is gradually increased with time to a its normal value. Thereafter, at 242 the microprocessor 76 determines whether the desired current value is greater than a predetermined maximum value. If so, the microprocessor 76 at 244 sets current value to the predetermined maximum current value. Similarly, at 246 the microprocessor 76 determines whether the output current value is less than a predetermined minimum; and if so, at 248 sets the output current value at 248 to be equal to the predetermined minimum value. As previously indicated, the output current value is converted by the digital/analog converter 116 at 226 to a desired analog value, is amplified by the servo amplifier 118 and is output on line 24 to the servo valve 26.

To provide effective fluid dispensing control, the servo control 74 periodically evaluates during each dispensing cycle a model of flow rate of fluid through the nozzle to periodically determine a desired nozzle pressure as a function of the desired flow rate during a dispensing cycle. The model of flow rate of the fluid through the nozzle is expressed as follows.

$$FR = A \times P^N \times e^{b \times \Delta T}$$

where
FR=Adhesive Flow Rate
P=Nozzle Pressure
A=First Flow Characteristic Constant
N=Second Flow Characteristic Constant
b=Temperature Sensitivity Factor
$\Delta t = T_i - T_{i-1}$ In shorter dispensing cycles it can be reasonably assumed that the temperature will remain relatively constant. Therefore, in those cycles, the change in temperature can be assumed to be zero; and the model may be simplified as follows.

$$FR = A \times P^N$$

The model requires that initial valves be established for the terms or constants A and N. Those initial values may be established by running a material calibration cycle or flow characteristic calibration process. The A term represents a flow characteristic constant that is correlated to the relationship between the flow rate of fluid through the nozzle and nozzle pressure. Therefore, the value of A will be dependent on the viscosity of the fluid. Further, the value of the A takes into effect the flow non-linearities that result from the shear effects from a given nozzle. The value of the N term is correlated to and is more directly influenced by the flow non-linearities caused by shear effects of the fluid flow through the nozzle. Therefore, preferably anytime a nozzle is changed or anytime the type of fluid being dispensed is changed, the values of the constants A and N should be reevaluated by running the material calibration cycle.

Figure 4:
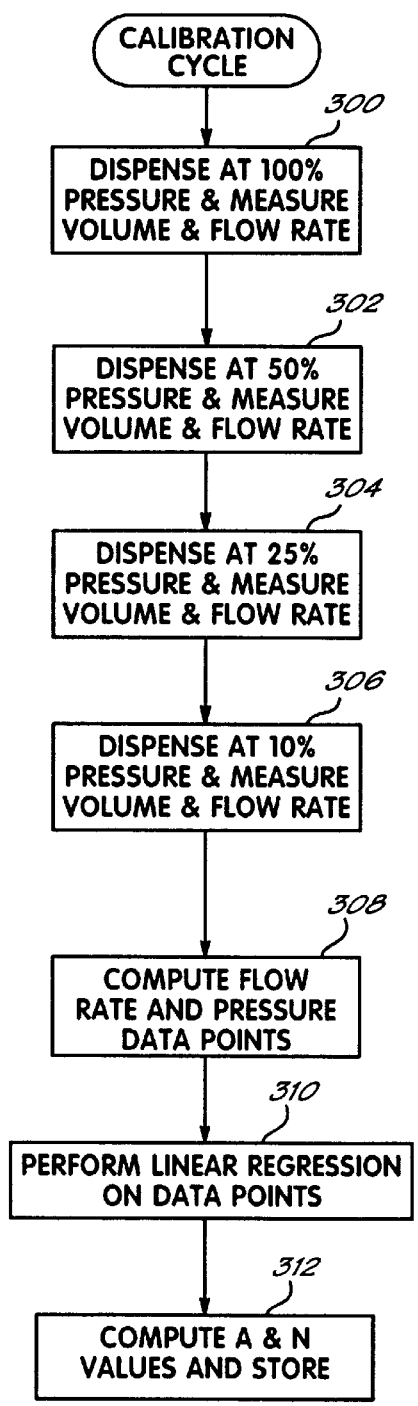
FIG. 4 is a flow chart illustrating the process steps in the calibration cycle of the fluid dispensing process.

Thereafter, to the extent there are any environmental factors that change the fluid flow characteristics, a periodic recomputation of the value of A will reflect the change in the relationship between a flow rate of fluid from the nozzle and nozzle pressure that is caused by those changes in fluid flow characteristics. Since one object of the present control is to provide a fluid dispensing control that is independent of the particular workpiece or part, the material calibration cycle is executed by simply purging the desired fluid through the nozzle to be used in production with instrumentation that permits the detection of a measured volume of material dispensed and a measured nozzle pressure. Preferably, the fluid dispensing control 22 is used to automatically run the material calibration cycle. The material calibration cycle is selected and started by an operator using the operator I/O devices 40. Upon the start of the calibration cycle, the supervisor control 49 initiates a sequence of events which are generally illustrated in the subroutine of FIG. 4.

In running the subroutine, the supervisor control 49 first at 300 provides a maximum desired pressure value to the dual port RAM 70 of the servo control 74 to dispense or purge fluid through the nozzle 36 with the metering valve 30 in the dispensing gun 28 open to its maximum, that is, full open position. In response to that maximum desired pressure, the microprocessor 76 executing the subroutine of FIG. 3 produces an output signal via the D/A converter 116, servo amp 118 and line 24 to the servo valve 26 to operate the servo valve 26 and the metering valve 30 so that fluid is dispensed from the dispensing gun at maximum, that is, 100% of the nozzle pressure. The microprocessor 76 is also reading the value of the velocity signal on line 92 and the pressure signal on line 98. Pursuant to the servo control subroutine of FIG. 3, the microprocessor 76 performs a digital PID processing of the pressure and velocity feedback signals to maintain the output current signal on line 24 at a value commensurate with the maximum desired pressure signal.

During the dispensing period, as previously described with regard to FIGS. 2 and 3, the microprocessor 76 periodically reads and stores a measured pressure from the pressure transducer 100. At the time the supervisor control 49 provides the maximum desired pressure value to the servo control 74, it also provides a reset counter command to cause the servo control 74 to reset the counter 114. Simultaneously therewith, the supervisor control 49 starts a cycle timer that measures the time period of the calibration fluid dispensing cycle. During the dispensing cycle, the supervisor control 49 periodically, for example, every 10 ms, provides a read counter command to the dual port RAM 70 requesting the microprocessor 76 to read the counter 114 and write that value in a respective location in the dual port RAM 70. When the counter 114 reaches a predetermined count, for example, 1000, which count is detected by the supervisor control 49, the supervisor control 49 then stops the operation of the cycle timer and reads and stores the elapsed time measured by the cycle timer. The supervisor control 49 then produces a zero value desired pressure command to the servo control 74 that is effective to turn the dispensing gun OFF. During the above 100% pressure calibration cycle, the supervisor control 49 also periodically reads from the dual port RAM 70 a measured nozzle pressure detected by the servo control 74. Preferably, the supervisor control 49 calculates an average of those pressure values and stores the average pressure value for future use. Therefore, at the end of the 100% pressure calibration cycle, the supervisor control 49 has stored a dispensed volume value, a measured nozzle pressure value and a dispensing cycle time period.

The supervisor control 49 also attempts to detect a nozzle clog or some other event that prevents the dispensing of the desired volume of fluid. For example, if the 1000 pulses are not counted within a predetermined period, for example, a 90 second period, the supervisor control 49 ends the 100% pressure calibration dispensing cycle and produces a calibration error message to the operator I/O devices 40.

A similar process is repeated at process steps 302, 304 and 306 in which the fluid volume and nozzle pressure are measured and stored for dispensing cycles which are executed at desired pressures equal to 50% maximum pressure, 25% maximum pressure, and 10% maximum nozzle pressure values, respectively. However, since lesser volumes of fluid are dispensed with successively lower pressures, the number of pulses detected during each of those cycles is successively smaller. For example, in the successive calibration cycles at 50%, 25% and 10% maximum nozzle pressure, the dispensing cycle is ended after the counter 114 has detected 600 pulses, 300 pulses and 100 pulses, respectively. Similarly, absent those numbers of pulses being counted, the supervisor control 49 ends the successive calibration cycles at 50%, 25% and 10% nozzle pressure after 90 seconds, 120 seconds and 240 seconds, respectively; and provides respective calibration error messages.

The purpose of the material calibration process is to determine the then current fluid flow characteristics for the fluid and nozzle being used. It is known that the relationship of pressure to volume flow or flow rate is nonlinear; and therefore, in determining those characteristics, the supervisor control 49 uses the natural log values of the measured data to approximate the best linear relationship that can be associated with the measured data. The supervisor control at 308 computes four natural log of pressure values as follows:

$$X_n = \ln P_{MEAS\ @X\%P}$$

where $P_{MEAS\ @X\%P}$=Average Measured Pressure at the Set % of Maximum Pressure In addition, the supervisor control computes four natural log of flow rate values for each of the four calibration dispensing cycles as follows:

$$Y_n = \ln\left(\frac{VOL_{MEAS\ @X\%P}}{DISPENSE\ TIME\ @\ X\%P}\right)$$

where $VOL_{MEAS\ @X\%}$=Measured Volume at the Set % of Maximum Pressure

Two dimensional data coordinate values are defined by each of the four natural log of pressure values and a corresponding one of the four natural log of flow rate values. The supervisor control 49 at 310 performs a linear regression on the four sets of coordinate values, for example, a least squares regression, to identify a straight line represented by the four data points computed at 308. Next, at 312 the supervisor control 49 sets a value of the constant N equal to the slope of the straight line identified at 310 as follows:

$$N = \frac{\Delta Y_n}{\Delta X_n}$$

The supervisor control 49 also determines a calibration value for the constant A as follows:

$$A = e^{y\ intercept}$$

The supervisor control 49 also at 312 stores the calibrated values of the constants A and N in RAM 52, and the control 22 is ready to begin a production cycle. The above material calibration process provides a calibration of the material flow and the nozzle at a time immediate preceding production, and therefore, is more accurate than prior calibration processes. The process is preferably performed at four desired pressures but may be performed at three desired pressures, and therefore, is easier and less complex than prior methods. Further, the material calibration may be done automatically by purging fluid through the gun, and no workpieces or parts are needed.

After the material calibration cycle is completed, the fluid dispensing control is switched by the operator via the I/O devices 40 to an operating or fluid dispensing mode, the process of which is executed by the flow control subroutine at 210 of FIG. 2. The flow control subroutine at 210 is stored in ROM 80 of the servo control 74, and the subroutine at 210 is illustrated in more detail by the flow chart of FIG. 5. Immediately upon the operator initiating the operating mode, the supervisor control 49 awaits the receipt of a cycle start signal on one of the digital I/O signal lines 62. When the workpiece 38 and dispensing gun 28 achieve a predetermined relative position, that predetermined position is detected; and a part strobe signal that is, an ON state, is provided on one of the digital I/O input lines 62 as a cycle start signal which is detected by the supervisor control 49 and is written to the dual port RAM 70. The cycle start signal is read from the RAM 70 by the servo control 74 at 350. After detecting a cycle start signal at 350, the servo control 74 then reads the values of A and N from the dual port RAM 70. The values of A and N were previously updated to the dual port RAM 70 by the supervisor control 49 which stores those values in the nonvolatile RAM 52. Thereafter, at 352 the servo control 74 sets the current value of the desired volume to zero and resets the value of IPN to zero. The IPN and desired volume values are determined by a digital integration process over the dispensing cycle and therefore those values are set to zero at the beginning of the dispensing cycle.

Thereafter, an ON state of a dispensing gun ON/OFF signal is provided to another of the digital I/O input lines 62 which is detected by the supervisor control 49, is written to the dual port RAM 70 and is detected by the microprocessor 76 within the servo control 74. The servo control 74 then reads the bead size value and the current value of the tool speed at 358. The bead size value is a constant entered by the operator that represents the desired diameter of the bead of fluid to be applied to the workpiece. The bead size is stored within the nonvolatile RAM 52 of the supervisor control 49, and the supervisor control 49 writes the bead size value into the appropriate location of the dual port RAM 70 for use by the servo control 74.

The tool speed value represents the relative velocity between the workpiece 38 and the dispensing gun 28. As previously noted, either or both may be moving depending on the application. A tool speed signal is received on line 84 and processed by a tool speed signal conditioning circuit 86. Preferably the tool speed signal conditioning circuit 86 has a common mode noise rejection input configuration to provide noise isolation, and further includes a low pass filter to provide a stable tool speed signal of the proper voltage level to the A/D converter 88. Therefore, the microprocessor 76 samples the output of the tool speed signal interface 86 and writes the digital tool speed signal value from A/D converter 88 into an appropriate location within the dual port RAM 70.

At 360 the servo control 74 computes the desired flow rate which is the product of the values of the tool speed, the bead size and a scaling factor which scales the magnitude of the desired flow rate value so that it is compatible with the scale of other dimensional units.

$$FR_{DES} = BS \times TS \times k$$

where

BS=Current Value of Bead Size

TS=Current Value of the Tool Speed Signal k=Scaling Factor

At 362, the servo control 74 then computes the desired volume or volume set point of the fluid to be dispensed during the dispensing cycle. In contrast to prior fluid dispensing controls, the volume set point is not utilized in determining the desired nozzle pressure; but with the present dispensing control, the volume set point is utilized between dispensing cycles to determine any error between the measured volume of fluid dispensed and the desired volume, that is, the volume set point. A unique aspect of the present invention is that the volume set point is determined in real time by integrating the value of the desired flow rate over the dispensing cycle. During a particular sample period, for example, a 10 ms period, the desired flow rate will theoretically result in the desired volume of fluid being dispensed over that sample period. The integration, that is the accumulation or summation, of the desired flow rates for each of the sample periods represents in real time the total desired volume of fluid to be dispensed, that is, the volume set point. Therefore, at 362 the servo control 74 performs a step of that integration as follows:

$$VOL_{DES} = VOL_{DES} + FR_{DES} \times 0.01$$

For a sample period of 10 ms, the servo control 74 multiplies the value of the desired flow rate by 0.01 and adds that value to a stored accumulation of integrated desired flow rate values from previous executions of the step 362 during the dispensing cycle. Therefore, at the end of the fluid dispensing cycle, the accumulated desired volume provided by the process at step 362 represents the volume set point for that dispensing cycle.

Thereafter, if the temperature compensation has not been selected as detected at 364, the servo control 74 at 366 computes the desired nozzle pressure in accordance with the following.

$$P_{DES} = \left(\frac{FR_{DES}}{A}\right)^{\frac{1}{N}}$$

where $P_{DES}$=Desired Nozzle Pressure $FR_{DES}$=Desired Flow Rate

A=First Flow Characteristic Constant

N Second Flow Characteristic Constant

The above is derived by rearranging the flow rate model previously set forth. The servo control 74 updates the new desired nozzle pressure value in the RAM 78 within the servo control 74; and flow of fluid through the nozzle is then commanded by the servo control 74 in accordance with new nozzle pressure value pursuant to the servo control routine of FIG. 3 previously described. The flow control process at 356 checks whether the fluid dispensing gun ON/OFF signal is still ON. As long as the dispensing gun ON/OFF signal remains in its ON state, the servo control 74 iterates through dispensing cycle steps 358–366 on a periodic basis, for example, every 10 milliseconds, as determined by the power ON routine of FIG. 2. The dispensing cycle is terminated by the dispensing gun ON/OFF signal switching to an OFF state which is detected by the servo control 74 at 356; and the process returns to detect an end of cycle at 212 of FIG. 2. During a dispensing cycle, the dispensing gun may be turned ON and OFF several times depending on the nature of the workpiece, the pattern of fluid to be dispensed, etc. Even though a dispensing gun OFF state is detected, if an end of flow control cycle, that is an end of part, is not detected by the servo control 74 at 212 of FIG. 2, the process of FIG. 5 will await the occurrence of another dispensing gun ON signal. When that signal is received, the flow control cycle of FIG. 5 will be executed every 10 ms as described above.

At the end of a part, that is, an end of a flow control cycle, the part strobe signal changes to an OFF state on the digital I/O lines 62 and that change of state is detected by the supervisor control 49 which writes that OFF state to the dual port RAM 70. The end of flow control cycle is detected at 212 of FIG. 2, and the servo control 74 writes the new values of the IPN and material flow volume into the dual port RAM 70. The derivation and use of the IPN value will subsequently be described. The material flow of volume is represented by the value that accumulates in the counter 114 over a dispensing cycle. The counter 114 is connected to a pulse encoder 110 that produces pulses on line 112 that are detected and counted by the counter 114. The pulse encoder 110 may be any device that produces pulses in a range from approximately 100 pulses per revolution to approximately 2,000 pulses per revolution of an input shaft. The choice of a particular encoder is generally dependent on the application and other components used in the dispensing system. The input shaft of the pulse encoder 110 is connected to a gear-type flow meter 108 which is operated by fluid flowing from the fluid source 32 to the dispensing gun 28. Therefore, during the dispensing cycle the counter 114 maintains a pulse count that is proportional to the detected or measured volume of fluid flowing through the dispensing gun 28 as measured by the flow meter 108.

Figure 6:
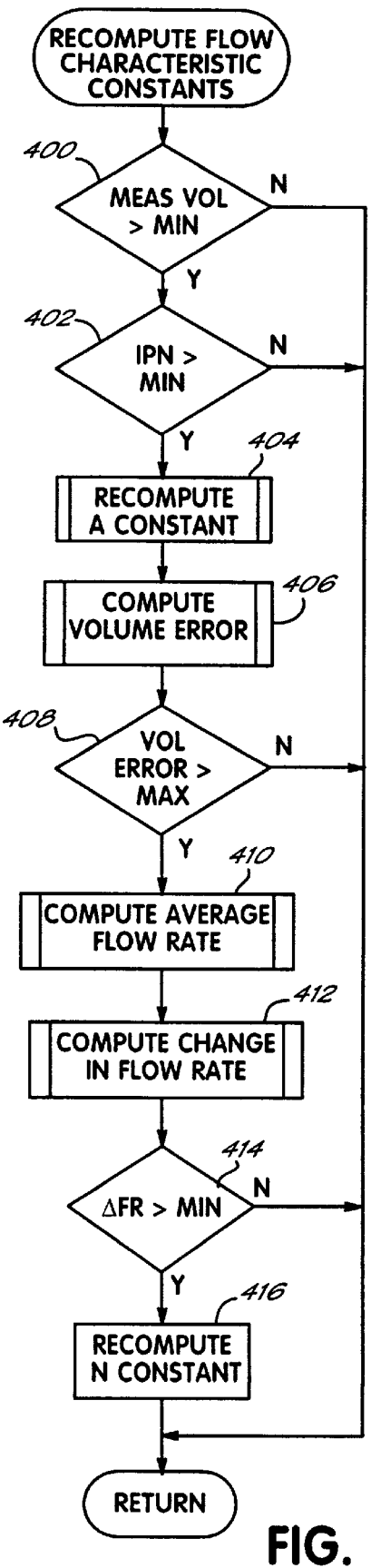
FIG. 6 is a flow chart illustrating a process for evaluating the constants representing the flow characteristics of the fluid through the nozzle.

When the part strobe signal changes to an OFF state as detected by the supervisor control 49, the supervisor control then proceeds to compute new values for the flow characteristic constants as illustrated in the subroutine of FIG. 6. Before recomputing any of the flow material parameters, the subroutine first determines whether, over the prior dispensing cycle, the volume of fluid dispensed exceeded a predetermined minimum value, and further, whether the average nozzle pressure during that cycle exceeded a predetermined minimum pressure value. The relationship between flow rate and pressure is an exponential one and has a graphical representation that is generally parabolic in shape. Therefore, pressure changes at lower pressure values produce very little change in flow rate. The values of the minimums chosen will be a function of the desired accuracy of the system and the resolution of the measuring system, that is, the resolution of the pulse encoder 110 and the flow meter 108. The minimums must be chosen so that a recomputation of the flow characteristic constants will increase the accuracy of the fluid dispensing process and not introduce instabilities therein. Therefore, the supervisor control 49 at 400 of FIG. 6 determines whether the volume of fluid dispensed during the previous cycle as measured by the encoder 110 and counter 114 is greater than a predetermined minimum volume. In addition, at 402 the supervisor control 49 determines whether the IPN value which is correlated to the average pressure during the prior dispensing cycle is greater than a predetermined minimum IPN value. If either one of those conditions is not met, the subroutine of FIG. 6 is terminated. If both conditions are met, the supervisor control 49 then recomputes at 404 the value of the flow characteristic constant A.

The value of A is correlated to the relationship between measured flow rate of fluid through the nozzle and nozzle pressure. Consequently, if there has been a change in temperature which changes the viscosity of the fluid, that in turn, modifies the relationship between the flow rate of fluid through the nozzle fluid an nozzle pressure, and that change in viscosity will be accommodated in the recalculation of the flow characteristic constant A as follows:

$$A = \frac{VOL_{MEAS} \times k}{IPN}$$

where $VOL_{MEAS}$=Measured Volume of Fluid Dispensed k=Scaling Factor

The value of IPN is determined as follows:

$$IPN = \sum_{start}^{end} (P_{MEAS})^N \Delta t$$

where $P_{MEAS}$=Measured Pressure During Dispensing Cycle

N=Second Flow Characteristic Constant start=Start of Dispensing Cycle end=End of Dispensing Cycle The integration of $(P_{MEAS})^N$ is performed in the servo control subroutine of FIG. 3 as part of the integrate nozzle pressure values subroutine at 230. During each iteration through the servo control subroutine which occurs every 2 ms, the integration of $(P_{MEAS})^N$ is performed as follows:

$$IPN = IPN + (P_{MEAS})^N \times 0.002$$

Therefore, at the end of a dispensing cycle, the servo control process of FIG. 3 has at step 230 computed the IPN value. That value at 212 of FIG. 2 is written into a respective location of the dual port RAM 70 so that it is available to the supervisor control 49 for its recalculation of the flow characteristic constant A.

The supervisor control 49 thereafter at 406 computes the percentage error between the desired volume of fluid to be dispensed and the measured volume of fluid dispensed. The desired volume of fluid, that is, the volume set point, was determined by the servo control 74 integrating the desired flow rate over the period of the past dispensing cycle as discussed in FIG. 5 at 362. The volume error is computed in accordance with the following.

$$VOL_{ERROR} = \frac{VOL_{DES} - VOL_{MEAS}}{VOL_{DES}} \times 100$$

where
$VOL_{ERROR}$=Percent Error in Volume of Fluid Dispensed
$VOL_{DES}$=Desired Volume of Fluid to be Dispensed
$VOL_{MEAS}$=Measured Volume of Fluid Dispensed Thereafter, at 408 the volume error value is compared to a maximum volume error value. The maximum volume error value is typically chosen as a function of the accuracy to which the volume is to be controlled with respect to the volume set point. For example, preferably, the volume of fluid dispensed through the nozzle is to be maintained at ±5% of the volume set point. Therefore, the maximum volume error value is chosen to be 7%. If the calculated volume error is within the acceptable limit, the process of FIG. 6 is terminated. If the volume error exceeds the maximum limit, the supervisor control 49 at 410 then computes the average value of the flow rate during the prior dispensing cycle as follows:

$$FR_{AVG} = \left(\frac{VOL_{MEAS}}{DISPENSE\ TIME}\right)$$

As described, with respect to the operation of the servo control 74 at 214 of FIG. 2, at the end of a dispensing cycle, the microprocessor 76 reads the value of the counter 114 and writes that value into a location of dual port RAM 70. Therefore, the supervisor control 49 has available to it a value representing the volume of fluid dispensed during the previous dispensing cycle. In addition, in a manner similar to that described with respect to the calibration process, during the flow control process of FIG. 5, the servo control 74 will start and stop a timer in response to detecting the respective ON and OFF states of the dispensing gun ON/OFF signal. Therefore, at the end of a dispensing cycle, that timer will have recorded the total dispense time, that is, the dispensing gun is ON during the dispensing cycle; and that total time is written by the servo control 74 into the dual port RAM 70. The total dispense time is used by the supervisor control 49 in computing the average flow rate at 410.

At 412, the supervisor control 49 executes a subroutine that computes the change in flow rate in accordance with the following.

$$\Delta FR = FR_n - FR_{n-1}$$

where
$FR_n$=Average Flow Rate over Current Dispensing Cycle
$FR_{n-1}$=Average Flow Rate over Prior Dispensing Cycle In order for a change of flow rate to be computed, at least two successive dispensing cycles must have occurred. Therefore, the recompute flow characteristics subroutine must be executed twice in succession; and during each execution, the process at 408 must determine that the volume error exceeds the maximum value. During the first iteration, the process at 410 will compute a first average flow rate for the first dispensing cycle. During that iteration, the process at 412 is unable to compute a change in flow rate since only one average flow rate value exists. After the next dispensing cycle, if at 408 a volume error is detected that exceeds the maximum error, the process at 410 will then compute another average flow rate value for the immediately preceding dispensing cycle; and the process at 412 is then able to compute a difference or change in average flow rate values between two dispensing cycles in which there is an excessive volume error. Thereafter, at 414 the process determines whether the change in average flow rate is greater than a minimum change. If there is not a significant change in flow rate, the subsequent recalculation of the N value at 416 will not provide a significantly different value, and therefore, will provide little or no benefit. If the change in average flow rates is greater than the minimum limit as detected at 414, the process then at 416 recalculates the value of the flow characteristic constant N as follows.

$$N = \frac{\ln FR_n - \ln FR_{n-1}}{\ln P_n - \ln P_{n-1}}$$

where
$FR_n$=Average Flow Rate over Current Dispensing Cycle
$FR_{n-1}$=Average Flow Rate over Prior Dispensing Cycle
$P_n$=Average Pressure over Current Dispensing Cycle
$P_{n-1}$=Average Pressure over Prior Dispensing Cycle The average value of pressure during the prior dispensing cycle is determined at 230 in FIG. 3 as part of the integration of nozzle pressure values. The subroutine at 230 not only integrates the IPN value, but also integrates the $P_{MEAS}$ value as follows:

$$P_{AVG\ SUM} = P_{AVG\ SUM} + (P_{MEAS})$$

Therefore, at the end of a dispensing cycle, the process at 230 produces an average pressure value, that is calculated as follows:

$$P_{AVG} = \frac{P_{AVG\ SUM}}{Counter}$$

where
Counter=Counter+1

There are applications where the fluid dispensing process may experience changes in temperature that produce variations in the flow characteristics of the fluid that are not satisfactorily accommodated by the recalculation of the flow characteristic constants A and N. For example, a fluid dispensing cycle on a large workpiece may be of such length that temperature variations can adversely affect the flow characteristics of the fluid and the quality of the application of the fluid onto the workpiece. In those situations, a temperature compensation is desirable and is either programmably, or, manually selected; and that selection will be detected at 364 of FIG. 5; and a temperature compensation subroutine is executed at 368.

The temperature of the fluid being dispensed through the nozzle is measured by the temperature sensor 106 and is read by the microprocessor 76 in executing the servo control process of FIG. 3. The temperature is read at 232 of FIG. 3, and the microprocessor 76 writes the value of the temperature to an appropriate location in the dual port RAM 70. In executing the subroutine at 368, the servo control 74 first detects a change of temperature of the fluid being dispensed between successive iterations of the flow control loop of FIG. 5. There are many statistical techniques for detecting and determining a change of temperature to be used by the servo control 74. The change of temperature may be based on an average of temperature readings at different points in time. For example, the servo control loop of FIG. 3 which reads the temperature at 232, iterates preferably every 2 ms. However, the flow control process of FIG. 5 iterates every 10 ms. Therefore, with each iteration of the flow control process, the subroutine at 368 can monitor and average five different readings of the temperature sensor. Further, the temperature compensation subroutine at 358 may further utilize temperature readings that are based on moving averages of the measured temperature. In addition, the subroutine 368 may be designed so that a change in temperature is not recognized or processed until it exceeds a predetermined minimum magnitude. The exact process for detecting and establishing a particular temperature value and the determination of a minimum change in temperature will depend on the accuracy, resolution and repeatability of the temperature measurement system, that is, the temperature sensor 106, the RTD interface 102, and the D/A converter 88 of the temperature measurement system. The desired responsiveness of the model to the changes in temperature is also an important factor to consider. After the change in temperature is determined, the subroutine at 368 then recomputes the value of the b-term as follows.

$$b = \frac{\ln\left(\frac{A_N}{A_{N-1}}\right)}{T_n - T_{n-1}}$$

where $A_n$=First Flow Characteristic—Current Dispensing Cycle $A_{n-1}$=First Flow Characteristic—Prior Dispensing Cycle $T_n$=Temperature—Current Dispensing Cycle $T_{n-1}$=Temperature—Prior Dispensing Cycle Thereafter the desired pressure at 366 will be determined pursuant to the following flow rate model.

$$P_{DES} = \left(\frac{FR_{DES}}{A \times e^{b\Delta T}}\right)^{\frac{1}{N}}$$

where $P_{DES}$=Desired Nozzle Pressure $FR_{DES}$=Desired Flow Rate

A=First Flow Characteristic Constant

N=Second Flow Characteristic Constant $\Delta T$=Measured Change in Temperature b=Temperature Sensitivity Constant An initial value for the temperature sensitivity constant b can be determined by dispensing fluid on successive workpieces and then using the measured temperature values and calculated values of the first flow characteristic constant A for each part to compute the value of b.

In use, the fluid dispensing control of the present invention provides substantial advantages over previous controls. First, the previous calibration cycle during which fluid was deposited on a workpiece in order to empirically determine the volume set point is eliminated. Therefore, the dispensing control of the present invention is not in any way dependent on workpiece related parameters. The control of the present invention further produces initial values of the flow characteristics of the fluid being dispensed by automatically executing a calibration cycle with as few as three and preferably four data points. Previously eight to ten data points were used to establish a flow rate to pressure relationship. Further, the dispensing control produces desired nozzle pressure values by evaluating a model of flow rate of the fluid through the nozzle as a function of the initial values of the flow characteristics and a desired flow rate value. That model is independent of the volume set point and therefore is immune from any inaccuracies or instabilities that may be introduced into the dispensing control system because of inaccuracies in determining the volume set point. In addition, the value of the flow characteristic correlated to the flow rate-pressure relationship is preferably updated every dispensing cycle thereby continuously adjusting the flow rate model for changes in viscosity. A second flow characteristic constant within the flow rate model which is correlated to the flow non-linearities introduced by shear effects of the fluid flowing through the nozzle is initially determined in a calibration process and subsequently updated in response to significant detected errors in the volume of fluid being dispensed.

In a further unique aspect of the invention the fluid dispensing control evaluates a flow rate model that includes temperature as a variable.

The control measures changes in temperature and reevaluates the model to produce new desired nozzle pressure values thereby adjusting the flow of fluid through the dispensing gun as a function of those changes in temperature.

While the invention has been set forth by a description of the embodiment in considerable detail, it is not intended to restrict or in any way limit the claims to such detail. Additional advantages and modifications will readily appear to those who are skilled in the art. For example, even though the value of the flow characteristic constant A is described as being recomputed during every dispensing cycle, in some applications, the flow characteristic constant A may recomputed several times during a fluid dispensing cycle; or alternatively, A may be recomputed only when the detected error in the volume of fluid dispensed exceeds a predetermined minimum value, that is, independent of any particular dispensing cycle. Further, the integration described herein is generally a rectangular integration; however, a trapezoidal integration or other integration schemes, as appropriate, may be used. While the preferred embodiment of the invention has been described in association with dispensing a bead of fluid or adhesive, the flow control techniques can be used other fluid dispensing applications.

The invention therefore in its broadest aspects is not limited to the specific details shown and described. Accordingly, departures may be made from such details without departing from the spirit and scope of the invention.

What is claimed is:

1. A method of automatically calibrating a system for dispensing a fluid through a nozzle onto a workpiece by determining a flow characteristic constant as a function of fluid flow characteristics for the fluid and nozzle, wherein the system includes a flow meter providing an output signal as a function of a volume of the fluid dispensed, the method comprising:

dispensing fluid at different flow rates during successive calibration dispensing cycles;

measuring during each calibration dispensing cycle a plurality of nozzle pressure values;

calculating an average pressure value from the nozzle pressure values measured during each of the calibration dispensing cycles;

determining a measured volume value representing the fluid dispensed during each of the calibration dispensing cycles in response to output signals from the flow meter;

calculating a flow characteristic constant using the averages of the nozzle pressure values and the measured volumes of fluid dispensed during the calibration dispensing cycles.

2. The method of claim 1 further comprising:
determining a plurality of data points, each of the data points being determined from an average pressure value calculated during one of the calibration dispensing cycle and a corresponding measured volume value determined during the one of the calibration dispensing cycles;
determining a linear relationship with respect to the plurality of data points; and
determining the flow characteristic constant as a function of the linear relationship.

3. The method of claim 1 further comprising:
computing a natural log value of each of the average pressure values;
computing a natural log value of each of the measured volume values;
determining a plurality of data coordinate values, each data coordinate value being determined by a natural log value of an average pressure value measured during one of the calibration dispensing cycles and a natural log value of a measured volume value measured during the one of the calibration dispensing cycles; and
performing a linear regression on the plurality data coordinate values to identify a straight line represented by the data coordinate values.

4. The method of claim 3 further comprising performing a least squares regression on the plurality of data coordinate values.

5. The method of claim 3 further comprising determining a first flow characteristic constant as a function of a slope of the straight line.

6. The method of claim 5 further comprising setting the first flow characteristic constant equal to the slope of the straight line.

7. The method of claim 3 further comprising determining a second flow characteristic constant as a function of a y-intercept of the straight line.

8. The method of claim 7 further comprising determining the second flow in accordance with the following:

$$A = \epsilon^{y\ intercept}$$

9. The method of claim 3 further comprising measuring a length of time for each of the calibration dispensing cycles.

10. The method of claim 9 further comprising determining the natural log of each of the measured volume values in accordance with $$Y_n = \ln\left(\frac{VOL_{MEAS\ @X\%P}}{DISPENSE\ TIME\ @\ X\%P}\right)$$

where
$VOL_{MEAS\ @X\%}$ = Measured Volume at the Set % of Maximum Pressure.

11. The method of claim 1 further comprising dispensing fluid during successive calibration dispensing cycles at different flow rates extending substantially over the whole range of flow rates.

12. The method of claim 11 further comprising:
dispensing fluid during a first calibration dispensing cycle at approximately 100% of a maximum flow rate; and
dispensing fluid during a second calibration dispensing cycle at approximately 10% of the maximum flow rate.

13. The method of claim 12 further comprising dispensing fluid during a third calibration dispensing cycle at approximately 50% of a maximum flow rate.

14. A method of automatically calibrating a system for dispensing a fluid through a nozzle onto a workpiece by determining a flow characteristic constant as a function of fluid flow characteristics for the fluid and nozzle, wherein the system includes a flow meter providing an output signal as a function of a volume of the fluid dispensed, the method comprising:
dispensing fluid at different flow rates during successive calibration dispensing cycles;
measuring during each calibration dispensing cycle a nozzle pressure value;
determining a measured volume value representing the fluid dispensed during each of the calibration dispensing cycles in response to output signals from the flow meter;
determining a plurality of data points, each of the data points being determined from an pressure value determined during one of the calibration dispensing cycles and a corresponding measured volume value determined during the one of the calibration dispensing cycles;
determining a linear relationship with respect to the plurality of data points; and
calculating a flow characteristic constant as a function of the linear relationship.

15. The method of claim 14 further comprising identifying a straight line represented by the plurality of data coordinate values.

16. The method of claim 15 further comprising determining a first flow characteristic constant as a function of a slope of the straight line.

17. The method of claim 14 further comprising setting the first flow characteristic constant equal to the slope of the straight line.

18. The method of claim 17 further comprising determining a second flow characteristic constant as a function of a y-intercept of the straight line.

19. The method of claim 18 further comprising determining the second flow in accordance with the following:

$$A = \epsilon^{y\ intercept}.$$

20. A method of automatically calibrating a system for dispensing a fluid through a nozzle onto a workpiece by determining fluid flow characteristics for the fluid and nozzle, wherein the system includes a flow meter providing an output signal as a function of units of volume of the fluid dispensed, the method comprising:
dispensing fluid at a first flow rate during a first calibration dispensing cycle;
periodically measuring during the first calibration dispensing cycle a nozzle pressure to provide a plurality of nozzle pressure values;
calculating an average of the nozzle pressure values measured during the first calibration dispensing cycle;
determining a measured volume of fluid dispensed during the first calibration dispensing cycle in response to the output signal from the flow meter;
iterating the above steps of dispensing measuring, calculating and determining to dispense fluid at a second flow rate during a second calibration dispensing cycle; and
calculating a flow characteristic constant using the averages of the nozzle pressure values and the measured volumes of fluid dispensed during the first and second calibration dispensing cycles.

21. A method of automatically recalculating a flow characteristic constant for a fluid dispensing system dispensing a fluid through a nozzle onto a workpiece and including a flow meter providing an output signal as a function of a volume of the fluid dispensed, the flow characteristic constant being determined as a function of fluid flow characteristics for the fluid and the nozzle, the method comprising:

dispensing fluid through the nozzle during a dispensing period;

measuring during the dispensing period a plurality of nozzle pressure values;

determining a measured volume value representing the fluid dispensed during the dispensing period in response to output signals from the flow meter; and calculating a flow characteristic constant in response to the plurality of nozzle pressure values and the measured volume value during the dispensing period.

22. The method of claim 21 further comprising integrating the plurality of nozzle pressure values over the dispensing period.

23. The method of claim 22 wherein the first flow characteristic constant is determined in accordance with $$A = \frac{VOL_{MEAS} \times k}{IPN}$$

where
$VOL_{MEAS}$=Measured Volume of Fluid Dispensed
$k$=Scaling Factor
and $$IPN = \sum_{start}^{end} (P_{MEAS})^N \Delta t$$

where
$P_{MEAS}$=Measured Pressure During Dispensing Period
$N$=Second Flow Characteristic Constant
start=Start of Dispensing Period
end=End of Dispensing Period.

* * * * *